United States Patent Office 2,971,889
Patented Feb. 14, 1961

2,971,889

PRESS COATED ENTERIC TABLETS AND PROCESS FOR PREPARING THEM

Joseph V. Swintosky, Perkiomenville, Pa., assignor to Smith Kline & French Laboratories, Philadelphia, Pa., a corporation of Pennsylvania No Drawing. Filed Mar. 18, 1958, Ser. No. 722,155

11 Claims. (Cl. 167—82)

This invention relates to enteric coated medicament-containing tablets which are prepared by press coating procedures and the process for preparing such tablets.

Enteric coatings are used on medicaments to protect an orally ingested medicament against release in contact with the acid juices of the stomach and, at the same time, to allow release of the medicament by the action of the alkaline fluids of the intestine. Heretofore, it has been known to use polymeric materials such as cellulose acetate phthalate and shellac in enteric coatings. The materials are applied to the medicament usually in many successive layers applied by laborious pan coating treatment.

Now in accordance with this invention, enteric tablets are made using a granulation which is press coated onto a medicament core. The granulation (and hence the enteric coating) comprises a major portion of a nontoxic, pharmaceutically acceptable organic acid which is also crystalline and poorly water soluble together with a pharmaceutical binder. The acid comprises about 50% to 98%, preferably about 85–95%, of the granulation and possesses a dissociation constant at 25° C. within the range of about $1\times10^{-3}$ to about $1\times10^{-7}$. Solubility of the acid in distilled water at 25° C. should not exceed about 1%, weight-volume. If desired a mixture of organic acids in lieu of a single acid can be employed.

Exemplary of the nontoxic organic acids are benzoic, bibenzoic, salicylic, acetylsalicylic, hippuric, β-niphthoic, p-bromobenzoic, n-chlorobenzoic, p-chlorobenzoic, p-fluorobenzoic, fumaric, suberic, uric, m-phthalic, azelaic, sebacic, glutamic and aspartic acids or combinations of these acids. Preferably, the acid ingredient of the enteric coating will be benzoic, salicylic or hippuric acid or combinations of these acids.

The granulation will also contain a nontoxic pharmaceutical binder for example, gelatin, hydrogenated castor oil, a sugar, such as, for example, sucrose or glucose, or a gum such as, for example, acacia or tragacanth. The binder will be present in an amount within the range of 2% to 50% by weight of the total granulation mixture.

To prepare the granulation a solution, preferably aqueous, of the pharmaceutical binder is added to the previously triturated organic acid ingredient and the mixture is thoroughly blended to a consistency for granulation. An aqueous solution of gelatin, of sugar or of gum and a chloroform solution of castorwax are exemplary of satisfactory binder solutions. The mixture is screened and dried.

Advantageously a pharmaceutical lubricant such as, for example, magnesium stearate, stearic acid or calcium stearate in amount of about 0.25% to about 3%, preferably about 1%, by weight of the total granulation, is added and the resulting mixture is blended.

The resulting granulation is then compressed around a medicament core, for example, a tablet of medicament.

The compression is carried out, for example, by a rotary compression coating machine. The bottom punch is dropped from its uppermost position a sufficient distance to receive the lower granulation. The die cavity is filled with the granulation. The medicament core is placed in the center of the granulation. The punch is lowered to allow addition of granulation and the coat is compressed around the medicament core. This is a standard compression coating procedure and can be carried out using any of the standard compression coating machines.

The following examples are not limiting but are illustrative of the press coated enteric tablets of this invention and of the procedures for their preparation.

*Example 1*

Hippuric acid (100 g.) is triturated in a mortar. Hot gelatin solution (28 cc. of a 25% solution) is added to the hippuric acid and the resulting mixture is stirred. The mixture is screened through a U.S. #10 mesh screen, placed on paper trays and oven dried overnight at 120° F.

The dried granulation is reduced by passing through a U.S. #20 mesh screen. Magnesium stearate (1.0 g.) is passed through a U.S. #60 mesh screen and added to the granulation, mixing well.

The bottom punch on a compression coating machine is dropped and the die cavity is filled with the granulation. A tablet containing 90% aspirin and 10% starch is dropped into the center of the granulation, the punch is dropped and the die cavity filled with the granulation which is then compressed around the tablet.

The average hardness of five tablets measured on a standard Strong-Cobb tester is 14.0.

*Example 2*

To 50 g. of triturated benzoic acid is added 20 cc. of hot 25% aqueous gelatin solution. The resulting mixture is stirred, screened through a U.S. #10 mesh screen, placed on paper trays and oven dried overnight at 120° F.

The dried granulation is reduced by passing through a U.S. #20 mesh screen. Magnesium stearate (0.5 g., 60 mesh) is added and the resulting granulation is mixed.

This granulation is compressed around an aspirin tablet by the procedure of Example 1.

The average hardness of five tablets in Strong-Cobb units is 17.7.

*Example 3*

A mixture of hippuric acid (50 g.) and benzoic acid (50 g.) is triturated in a mortar. Hot gelatin solution (23 cc. of 25% aqueous solution) is stirred into the mixture, which is then screened through U.S. #10 mesh screen, placed on paper trays and oven dried overnight at 120° F.

The dried granulation is passed through a U.S. #20 mesh screen. Magnesium stearate (1.0 g., 60 mesh) is mixed into the granulation which is then compressed around an aspirin tablet by the procedure of Example 1.

The average hardness of five tablets in Strong-Cobb units is 26.8.

What is claimed is:

1. A press coated enteric tablet comprising a medicament core completely surrounded by a granulation mixture comprised of about 50–98% of a pharmaceutically acceptable organic acid with a dissociation constant of from about $1\times10^{-3}$ to about $1\times10^{-7}$ and a solubility in water of less than about 1%, weight to volume, and a pharmaceutical binder, said granulation being compressed around the medicament core.

2. A press coated enteric tablet in accordance with claim 1 characterized in that the organic acid is benzoic acid.

3. A press coated enteric tablet in accordance with claim 1 characterized in that the organic acid is salicylic acid.

4. A press coated enteric tablet in accordance with claim 1 characterized in that the organic acid is hippuric acid.

5. The method of forming an enteric tablet which comprises granulating a pharmaceutically acceptable organic acid with a solution of pharmaceutical binder, drying said granulation, the dried granulation containing about 50% to about 98% of the organic acid, and compressing the dried granulation mixture around the medicament core.

6. The method of claim 5 characterized in that the granulating composition is admixed with about 0.25% to about 3% by weight of the total granulation of a lubricating agent.

7. The method of forming an enteric tablet which comprises granulating a pharmaceutically acceptable organic acid with a dissociation constant of from about $1 \times 10^{-3}$ to about $1 \times 10^{-7}$ and a solubility in water of less than about 1%, weight to volume, with a solution of pharmaceutical binder, drying said granulation, the dried granulation containing about 50% to about 98% of the organic acid, and compressing the dried granulation mixture around the medicament core.

8. The method of claim 7 characterized in that the dried granulation contains from about 85% to about 95% of the organic acid.

9. The method of claim 7 characterized in that the organic acid is benzoic acid.

10. The method of claim 7 characterized in that the organic acid is salicylic acid.

11. The method of claim 7 characterized in that the organic acid is hippuric acid.

References Cited in the file of this patent

UNITED STATES PATENTS

| | | |
|---|---|---|
| 2,071,511 | Eldred | Feb. 23, 1937 |
| 2,757,124 | Wolff | July 31, 1956 |

OTHER REFERENCES

U.S. Dispensatory, 24th ed., 1947, Osol-Farrar, pp. 144, 145, 998 and 999.

Journal of the Am. Pharmaceutical Assoc., Prac. Pharmacy article by Bauer et al., vol. XIV, No. 8, August 1953, pp. 504–507, 512.